US008592064B2

(12) United States Patent
Lu (10) Patent No.: US 8,592,064 B2
(45) Date of Patent: Nov. 26, 2013

(54) INTELLIGENT MULTIFUNCTIONAL ACCUMULATOR

(75) Inventor: Kuo-Ching Lu, Taiwan (CN)

(73) Assignee: Yangjiang Mingyang Electronic Technology Co., Ltd., Guangdong (CN)

( * ) Notice: Subject to any disclaimer, the term of this patent is extended or adjusted under 35 U.S.C. 154(b) by 0 days.

(21) Appl. No.: 13/577,237

(22) PCT Filed: Feb. 5, 2010

(86) PCT No.: PCT/CN2010/000161
§ 371 (c)(1),
(2), (4) Date: Aug. 4, 2012

(87) PCT Pub. No.: WO2011/094896
PCT Pub. Date: Aug. 11, 2011

(65) Prior Publication Data
US 2012/0301758 A1    Nov. 29, 2012

(51) Int. Cl.
*H01M 2/00*  (2006.01)
*H01M 10/48*  (2006.01)
*H01M 2/26*  (2006.01)

(52) U.S. Cl.
USPC .............................. 429/61; 429/90; 429/121

(58) Field of Classification Search
USPC ............................................ 429/61, 90, 121
See application file for complete search history.

(56) References Cited

FOREIGN PATENT DOCUMENTS

| CN | 2419694 Y | 2/2001 |
| CN | 1561558 A | 1/2005 |
| CN | 2824319 Y | 10/2006 |
| CN | 201188430 Y | 1/2009 |
| JP | 2009-105022 A | 5/2009 |

OTHER PUBLICATIONS

International Search Report for PCT/CN2010/000161.

*Primary Examiner* — Helen O Conley
(74) *Attorney, Agent, or Firm* — The PL Law Group, PLLC (57) ABSTRACT

An intelligent multifunctional accumulator includes a multi-pin intelligent controller, a signal emitter, a buzzer, a sensor and an accumulator with an enclosure with two layers. All the aforementioned devices are assembled inside the cavity on the back side of the top cover. Two positive terminals are set on the top surface of the accumulator enclosure. The two positive terminals can separately control the power of the engine and other electric appliances by a chip and two relays to attain an anti-theft function. The intelligent controller can be automatically locked after it is inserted into a controller box on the back side of the top cover, and cannot be taken out without the password signal of a car owner. The sensor can automatically detect the inner state of the accumulator, and the information of the state can be displayed by an LCD or sent out by using voice prompts.

7 Claims, 5 Drawing Sheets

INTELLIGENT MULTIFUNCTIONAL ACCUMULATOR

CROSS REFERENCE TO RELATED APPLICATIONS AND CLAIM OF PRIORITY

This patent application is a National Phase application under 35 U.S.C. §371 of International Application No. PCT/CN2010/000161, filed on Feb. 5, 2010, entitled INTELLIGENT MULTIFUNCTIONAL ACCUMULATOR, entire contents of which are incorporated herein by reference.

TECHNICAL FIELD

The invention relates to a multifunctional accumulator with an inner water sealing cap, and more particularly, to a new structure of an accumulator with an inner water sealing cap with two positive electrode output terminals, which combined with an intelligent controller integrally, can control the current outputs effectively. It is a battery device integrated with a plurality of functions such as power supply, anti-theft and alarm, self-detecting the state of the battery, LCD display, voice prompts and so on.

BACKGROUND

Generally, the accumulator only has the simple functions of charging and discharging. Most people do not know when to maintain the battery, until the battery does not work and is discarded. This is a damage to the environmental protection. It is particularly a waste of resources to the self-owned energy battery with simply one function. Although there are some devices wherein the battery has been increased an anti-theft function by some people, or a remote-control breaker in the cavity of the battery, power failure would cause the damage or the trouble of the requirement to reconfigure because many precise computer electronic devices are equipped in modern vehicles. In addition, once the anti-theft devices sealed in the cavity fault, they cannot be taken out to repair, and correspondingly the battery cannot be used either. Moreover, there are a device controlling the current output, wherein: although it is not powered off in the state of anti-theft, it is powered off by involuntary touching the alarms when using, because sometimes the car owner forgets to remove the anti-theft setting, and therefore results in the troubles and the inconveniences that the precise devices in the vehicle are damaged.

SUMMARY OF THE INVENTION

To overcome the problems that the existent functions of the battery are too simple, the equipping of breakers may cause the damage to the precise electronic devices in the vehicle. This present invention discloses an intelligent multifunctional accumulator, a controller with intelligent functions. The custom of using batteries with one positive electrode terminal and one cathode terminal is changed into the novel structure with two positive electrode terminals and one cathode terminal, combined with the hiding design in the cavity of the accumulator, and thus the power for the vehicle engine and the power for other devices are supplied power separately. In this way, the original accumulator with simply function of power supply, is updated into the uniform battery with various functions. The accumulator of the present invention not only has the functions of charging and discharging, but also can control the amount of the current output of the battery. Therefore, the battery is equal to an anti-theft device that effectively performs the function to protect the vehicle not to be theft. At the same time, a sensor disposed in the battery, automatically detects the inner state of the battery, constantly adds water, charges or maintains by voice prompts to increase the service life of the battery. In addition, the wireless remote-control plug-in controller using passwords can be free taken out or configured. When the accumulator is old and worn and needs replacing, the intelligent controller can still be used repeatedly, and the resources are not wasted.

The technology of the present invention is achieved as follows: an intelligent multifunctional accumulator, which is composed of an accumulator with two layers of sealing caps, a multi-plug intelligent controller, a sensor, a signal transmitter, and a buzzer, characterized in that: the accumulator with two layers of sealing caps is so configured that two positive electrode terminals, one cathode terminal are disposed on the top layer of the sealing caps; one of the said two positive electrode terminals is the engine special positive electrode terminal head on the front side of the top cap, the other is the positive electrode terminal head for other electric devices on the front side of the top cap; a box-case of the controller for the multi-plug intelligent controller to put in, a porous conductive socket corresponding to the plugs of the multi-plug intelligent controller in the box-case of the controller, a buzzer, a power introducing socket of the positive electrodes and the cathode, and a sensor signal introducing socket are disposed on the back side on the top layer of the sealing caps; during hot-fused packaging the top cap of the accumulator and the inner water sealing cap of the accumulator of the two layers of the sealing caps, the terminals of the positive electrodes and the cathode on the inner layer water sealing cap of the accumulator with two layers of sealing caps and the sensor signal terminal in the accumulator liquid-water tank tub are simultaneously inserted into the power introducing socket and the signal socket on the back side of the top cap, and are linked and introduced through the wires into the porous conductive socket; after the multi-plug intelligent controller with an electric lock is inserted into the box-case of the controller, a tongue of the lock is automatically inserted into a hole of the lock, and cannot be taken out if there is not a password signal; a plurality of plugs of the multi-plug intelligent controller are connected to the conductors in the porous conductive socket, the power and the signal are introduced through the plugs of the multi-plug intelligent controller into the circuit of the controller, and the engine special power, and of the power for other electric devices are controlled by the chip and the relay; after the sensor signal is computed by the chip, the inner state of the battery is displayed by an LCD or sent out by voice prompts.

The two positive electrode terminals, the one cathode terminal disposed on the top layer of the sealing caps in the accumulator with two layers of sealing caps, separately control and supply power for the engine power and for the power of other electric devices, by which the anti-theft is achieved effectively, and the precise electronic devices in the car is not affected.

The power wires and signal wires are all disposed on the back side of the top cap of the accumulator, all of the control circuits are totally circulated in the cavity formed by fusing the upper cap and the lower cap and in the controller case, and the circuits are in an unexposed state.

The buzzer is hidden in the cavity of the accumulator, the signal wires are directly introduced into the circuit of the controller in the box-case of the cavity of the battery, and the circuit is in an unexposed state.

The box-case of the controller is disposed on the back side of the top layer of the sealing caps of the battery, for the controller with a password remote control electric lock to insert into and to fasten, which cannot be taken out and damaged from the box-case of the controller.

Two big relays are disposed in the multi-plug intelligent controller; in the state of anti-theft setting, they are compared with the amount of the current defined by the chip to control respectively the power outputs for the engine power and for the power of other electric devices.

The sensor is disposed in the electrolyte and water tank, and the inner state of the battery is displayed by the LCD and sent out by voice prompts.

The present invention has the following technical effects:
1. The accumulator with two positive electrode terminals and one cathode terminal, to separately control and supply power for the power for the vehicle engine and the power for other devices are supplied power. This can not only effectively achieve the anti-theft, but also achieve the effect to avoid or prevent that the precise devices in the vehicles are affected by power failure, when the engine is started because of improper using or forgetting to remove the anti-theft setting.
2. In the alert state of anti-theft setting, the controller control the power in the mode of comparing with the predefined current, in the condition of the engine of the vehicle not to be started by secondly illegally wiring, the power normally supplies power in the predefined range of the amount of the current, to assure the effect of the normal operation of the precise devices of the vehicle.
3. The box-case of the controller is disposed on the back side of the top cap of the accumulator, and all the circuit wires are disposed on the back side of the top cap. After the top cap and the inner water sealing cap are fused, the controller is inserted into the box-case and is connected with the circuit to configure, and is hidden and circulating in the cavity formed by fusing the upper cap and the lower cap, and all of the control wires of the circuit are in an unexposed state to achieve the effects of effectively anti-theft and not worry about damages by cutting the wires.
4. The buzzer and the signal wires are all hidden in the cavity disposed in the accumulator and are in an unexposed state to achieve the effect of preventing the buzzer being damaged by cutting the wires by the thieves when the alarm sounds ring.
5. A mini electric lock disposed in the controller is automatically locked when putting into the box-case, and it can not be taken out, if there is not the password. This can achieve the effects of integrating the controller and the accumulator in one closely, and not easy to be theft out and damaged.
6. The lock device of the controller controlled by the password can be free taken out or configured by the users. The following effects are achieved that when the controller needs repairing or the accumulator is old and worn and needs replacing, they can be taken out to repair and be used repeatedly, and the resources are not wasted.
7. The following effects are achieved that the sensor automatically detects the inner state of the battery, to detect the result with an LCD or by voice prompts to the user, and constantly reminds the user to know the condition of the battery, to maintain it sufficiently and to increase the service life of the battery, to reduce the troubles caused by lack of the functions of the battery in the half way of the vehicle driving.

BRIEF DESCRIPTION OF THE DRAWINGS

The present invention will be described in detail by way of illustrative example with reference to the accompanying drawings, in which.

BRIEF DESCRIPTION OF THE REFERENCE SIGNS

1: the multi-plug intelligent controller; 2: the accumulator with two layers of sealing caps; 2-1: the top cap of the accumulator; 2-1-1: the front side of the top cap of the accumulator; 2-1-2: the back side of the top cap of the accumulator; 2-2: the inner water sealing cap of the accumulator; 2-3: the accumulator liquid-water tank tub; 3: the signal transmitter; 4: the buzzer; 5: the positive electrode terminal on the inner sealing cap; 6: the cathode terminal on the inner sealing cap; 7: the sensor signal terminal; 8: the sensor; 9A: the positive electrode terminal head for other electric devices on the front side of the top cap; 9B: the positive electrode terminal tail for other electric devices on the back side of the top cap; 10A: the engine special positive electrode terminal head on the front side of the top cap; 10B: the engine special positive electrode tail on the back side of the top cap; 11A: the cathode terminal head on the front side of the top cap; 11B: the cathode terminal tail on the back side of the top cap; 12: the box-case of the controller; 13: positive electrode output plug for other electric devices; 14: the positive electrode power input plug; 15: the engine special power output plug; 16: the plug of the signal wire of the buzzer; 17: the cathode power input plug; 18: the introducing plug of the signal wire of the sensor; 19: the relay controlling other electric devices; 20: the relay controlling the engine power; 21: the chip; 22: the signal receiving module; 23: the electric lock; 24: the LCD; 25: the positive electrode power introducing socket; 26: the cathode power introducing socket; 27: the sensor signal introducing socket; 28: a hole of the lock; 29: the porous conductive socket; 30: the positive electrode conductor for other electric devices; 31: the positive electrode power input conductor; 32: the engine special positive electrode power output conductor; 33: the conductor of the signal wire of the buzzer; 34: the cathode power input conductor; 35: the sensor signal input conductor.

DETAILED DESCRIPTION

Figure 1:
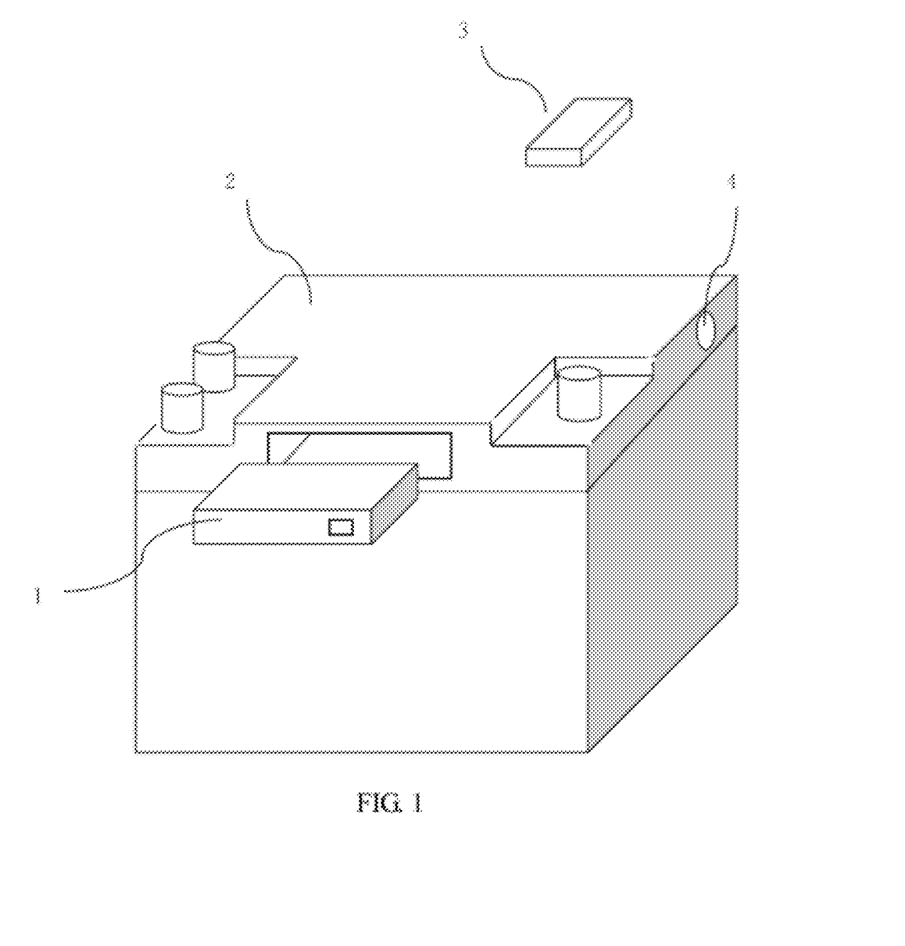
FIG. 1 is a stereographic view of the main devices of an embodiment of the present invention.
Figure 2:
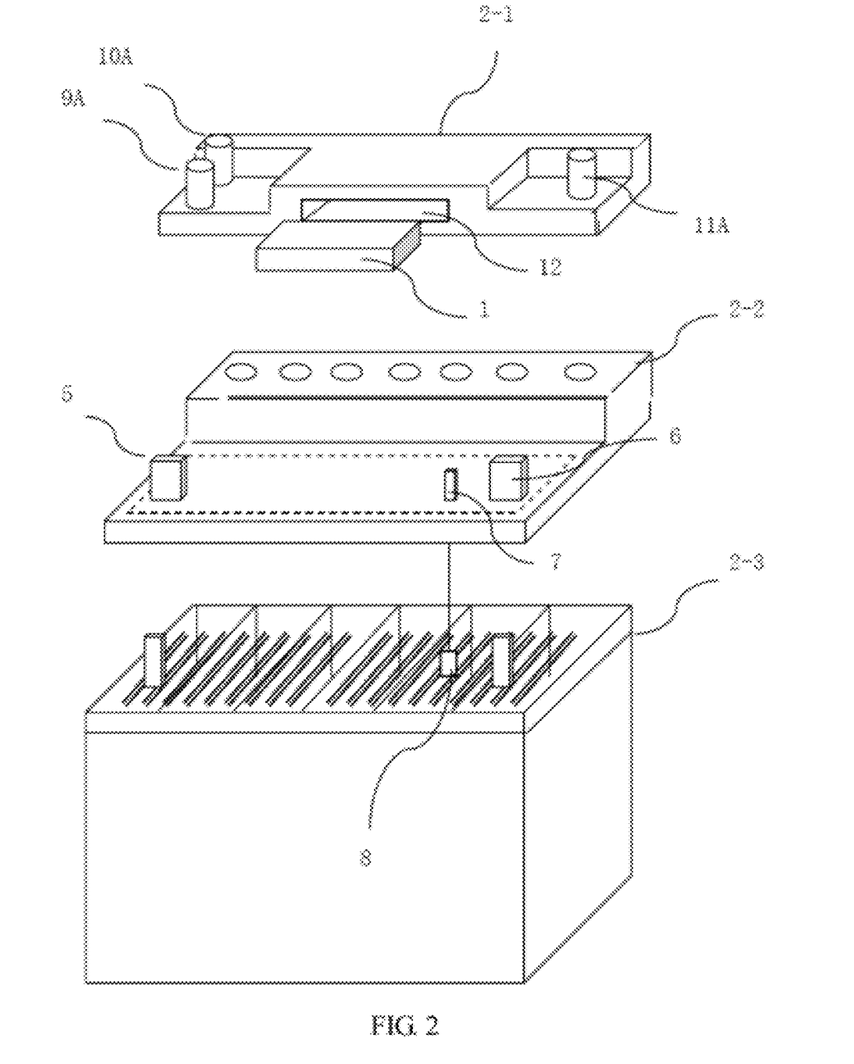
FIG. 2 is an exploded view of the combination of the devices an embodiment of the present invention.

In the embodiment as shown in FIG. 1 and FIG. 2, the present invention is substantially composed of a multi-plug intelligent controller 1, an accumulator with two layers of sealing caps 2, a signal transmitter 3, a buzzer 4, a controller box-case 12, and a sensor disposed in the electrolyte tank 8.

In the embodiment as shown in FIG. 2, the accumulator 2 with two layers of sealing caps is illustrated; a positive electrode terminal 5 on the inner sealing cap and a cathode terminal 6 on the inner sealing cap, both of which are connected with the electric plate grids of the positive electrodes and the cathode, and a sensor signal terminal 7 are disposed on the inner water sealing cap 2-2 of the accumulator; the sensor signal terminal 7 is connected with the sensor 8 configured in the accumulator liquid-water tank tub 2-3 through the wires.

Figure 4:
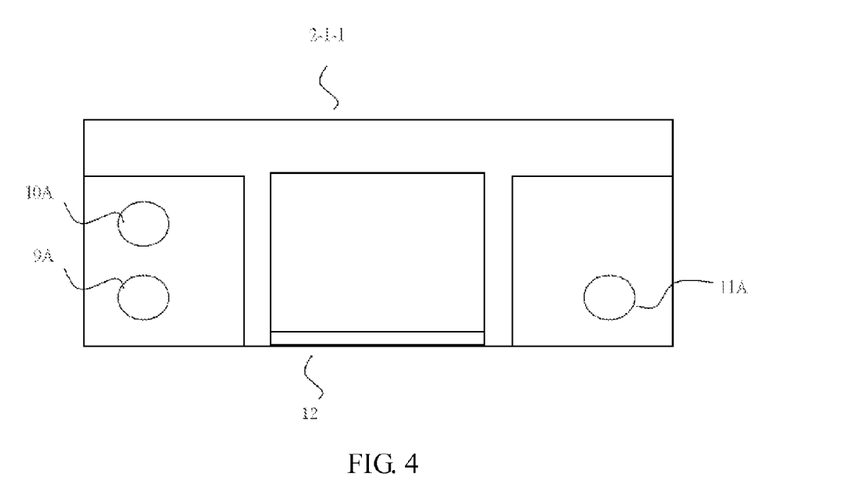
FIG. 4 is a schematic view of the devices on the front side of the top cap of the accumulator of an embodiment of the present invention.

In the embodiment as shown in FIG. 4, two positive electrode terminals 9A, 10A, and one cathode terminal 11A are disposed on the front side 2-1-1 of the top cap of the accumulator. One of the said two positive electrode terminals is the engine special positive electrode terminal head 10A on the front side of the top cap, the other is the positive electrode terminal head 9A for other electric devices on the front side of the top cap.

Figure 5:
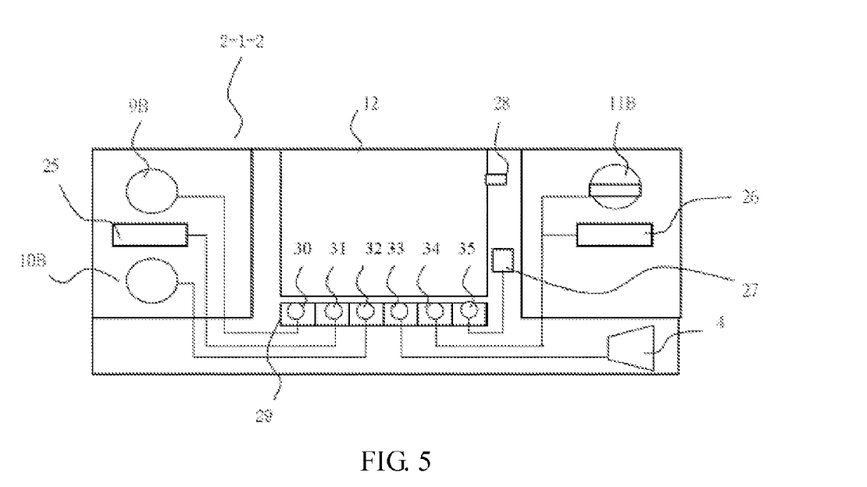
FIG. 5 is a schematic view of the wires and the devices on the back side of the top cap of the accumulator of an embodiment of the present invention.
Figure 6:
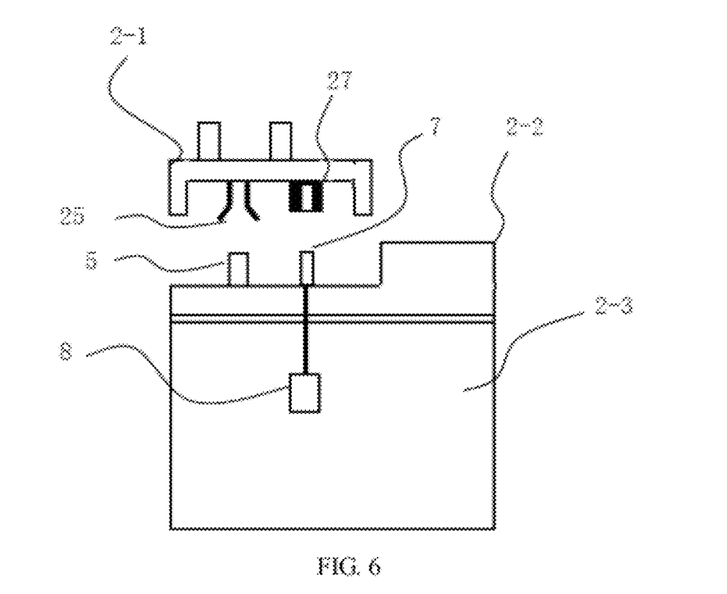
FIG. 6 is a side view of on the back side of the top cap of the accumulator an embodiment of the present invention, wherein the terminal socket is engaged with the inner sealing cap terminals.

In the embodiment as shown in FIG. 5 and FIG. 6, a controller box-case 12 for the multi-plug intelligent controller 1 to put in, a porous conductive socket 29 corresponding to the plugs of the multi-plug intelligent controller 1 in the controller box-case 12, a positive electrode power introducing socket 25 corresponding to the positive electrode terminal 5 on the inner water sealing cap 2-2 of the accumulator, a cathode power introducing socket 26 corresponding to the cathode terminal 6 on the inner sealing cap 2-2, a sensor signal introducing socket 27 corresponding to the sensor signal terminal 7, and a buzzer 4 are disposed on the back side 2-1-2 of the top cap of the accumulator. The positive electrode conductor 30 for other electric devices, the positive electrode power input conductor 31, the engine special positive electrode power output conductor 32, the conductor 33 of the signal wire of the buzzer, the cathode power input conductor 34, and the sensor signal input conductor 35, are built in the porous conductive socket 29. The positive electrode conductor 30 for other electric devices are connected by the wires with the positive electrode terminal tail 9B for other electric devices on the back side of the top cap; the positive electrode power input conductor 31 are connected by the wires with the positive electrode power introducing socket 25; the engine special positive electrode power output conductor 32 are connected by the wires with the engine special positive electrode tail 10B on the back side of the top cap; the conductor 33 of the signal wire of the buzzer are connected by the wires with the signal wire of the buzzer 4; the cathode power input conductor 34 are connected by the wires with the cathode power introducing socket 26 and the cathode terminal tail 11B on the back side of the top cap; and the sensor signal input conductor 35 are connected by the wires with the sensor signal introducing socket 27. A lock hole 28 is further disposed in a proper position on the side of the controller box-case 12.

In the embodiment as shown in FIG. 6, during hot-fused packaging the top cap 2-1 of the accumulator and the inner water sealing cap 2-2 of the accumulator, the positive electrode terminal 5, the cathode terminal 6 and sensor signal terminal 7 on the inner water sealing cap 2-2 of the accumulator are respectively inserted into the corresponding positive electrode power introducing socket 25, the cathode power introducing socket 26 and the sensor signal introducing socket 27 on the back side 2-1-2 of the top cap of the accumulator. Therefore, the battery power and the sensor signal are introduced through the wires into the positive electrode power input conductor 31, the cathode power input conductor 34, and the sensor signal input conductor 35 that are built in the porous conductive socket 29.

Figure 3:
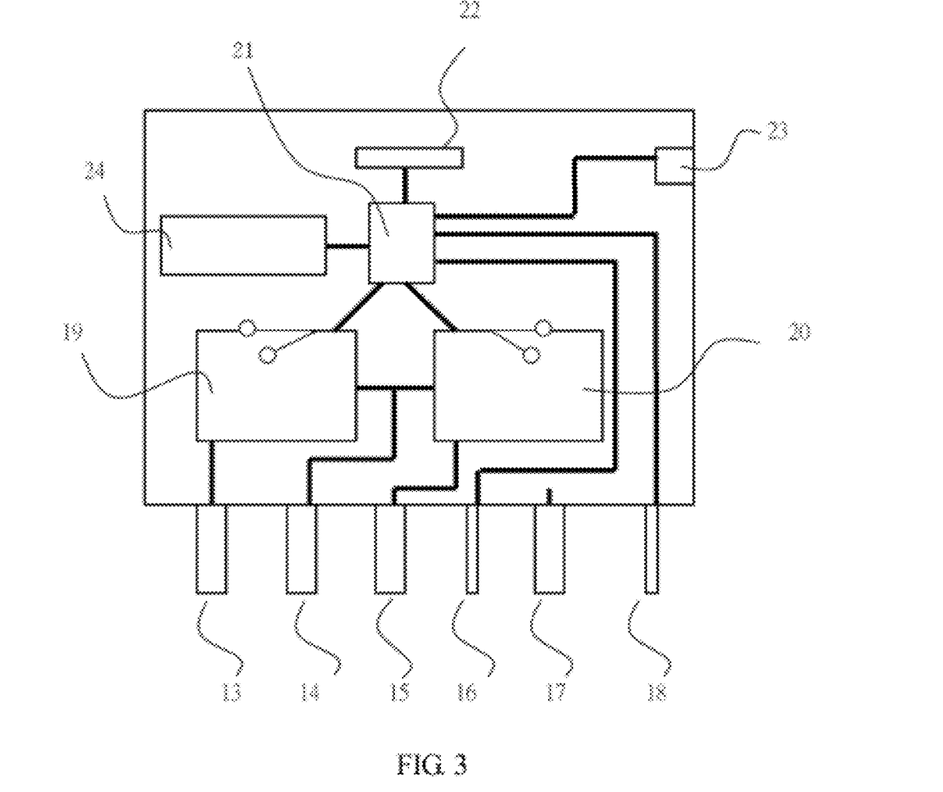
FIG. 3 is a circuit schematic view of the controller of an embodiment of the present invention.

In the embodiment as shown in FIG. 3: a plurality of the following plugs are disposed for the multi-plug intelligent controller 1: positive electrode output plug 13 for other electric devices, the positive electrode power input plug 14, the engine special power output plug 15, the plug 16 of the signal wire of the buzzer, the cathode power input plug 17, and the introducing plug 18 of the signal wire of the sensor; two built-in high-power relays disposed in the circuit of the multi-plug intelligent controller 1, wherein one is the relay controlling the engine power 20, the other is the relay 19 controlling other electric devices; and main devices such as a chip 21, a signal receiving module 22, an LCD 24, an electric lock 23 and so on.

Figure 7:
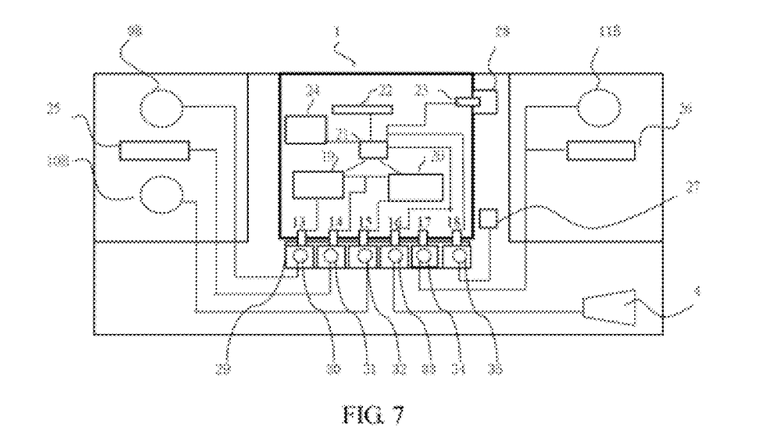
FIG. 7 is a schematic view of an embodiment of the present invention, wherein the controller is engaged with the circuit on the back side of the top cap of the accumulator.

In the embodiment as shown in FIG. 7: after the multi-plug intelligent controller 1 is inserted into the controller box-case 12, in the front end of the multi-plug intelligent controller 1, a plurality of plugs 13, 14, 15, 16, 17, 18 are inserted into the corresponding conductors 30, 31, 32, 33, 34, 35 in the porous conductive socket 29, in order to connect and switch on the power and the signal. Therefore, the positive electrode terminal 5 on the inner sealing cap of the accumulator 2 with two layers of sealing caps should be guided through the multi-plug intelligent controller 1, then be transmitted to the positive electrode terminals 9A, 10A on the top cap 2-1 of the accumulator; after the signal of sensor signal terminal 7 comes into the multi-plug intelligent controller 1, throughout the analysis and computation of the chip 21, the inner state of the accumulator 2 with two layers of sealing caps are either displayed with the LCD 24, or sent out by voice prompts, the signal wire of the buzzer 4 is also introduced into the chip 21 built in the multi-plug intelligent controller 1.

A detailed embodiment: after the multi-plug intelligent controller 1 is inserted into the controller box-case 12; in the front end of the multi-plug intelligent controller 1, a plurality of plugs 13, 14, 15, 16, 17, 18 are simultaneously inserted into the porous conductive socket 29, and are connected and switched on with the corresponding built-in conductors 30, 31, 32, 33, 34, 35, and are switched on with the circuit configured on the front side 2-1-1 on the top cap of the accumulator, a tongue of the built-in electric lock 23 is automatically inserted into a hole 28 of the lock, and is locked and fastened, the multi-plug intelligent controller 1 cannot be taken out from the controller box-case 12 if there is not an unlocking command of the signal transmitter 3.

No matter the multi-plug intelligent controller 1 is setting up or relieving the anti-theft state, as long as the power of the car is switched on, the sensor 8 configured in the accumulator liquid-water tank tub 2-3 in the accumulator 2 with two layers of sealing caps immediately transmits sensed signal through the wires into the multi-plug intelligent controller 1, and the state of the accumulator 2 with two layers of sealing caps is either displayed by the LCD 24 or sent out by voice prompts.

To perform the anti-theft function, the current is flowing as follows: the powers of the positive electrodes and the cathode in the accumulator 2 with two layers of sealing caps are introduced through the positive electrode terminal 5, and the cathode terminal 6 on the inner water sealing cap 2-2 of the accumulator into the positive electrode power introducing socket 25 and the cathode power introducing socket 26 on the back side 2-1-2 of the top cap of the accumulator; because the cathode power introducing socket 26 is not controlled, it is directly introduced through the wires into the cathode terminal tail 11B on the back side of the top cap, and introduced into the cathode terminal head 11A on the front side 2-1-1 of the top cap of the accumulator, and also is guided through the wires into the cathode power input conductor 34 in the porous conductive socket 29, it is introduced through the cathode power input plug 17 into the circuit board of the multi-plug intelligent controller 1, to supply the electric energy of the cathode required by the circuit of the multi-plug intelligent controller 1; while because the positive electrode power introducing socket 25 is controlled, it is not directly linked with the positive electrode terminal tail 9B for other electric devices on the back side 2-1-2 of the top cap of the accumulator, the engine special positive electrode tail 10B on the back side of the top cap, but the power of the positive electrode power introducing socket 25 is introduced through the wires into the positive electrode power input conductor 31 in the porous conductive socket 29, and introduced through the positive electrode power input plug 14 into the circuit board of the multi-plug intelligent controller 1.

When the multi-plug intelligent controller 1 is relieving the anti-theft state: After the current is guided into the multi-plug intelligent controller 1, then flows back through the engine special power output plug 15 and positive electrode output plug 13 for other electric devices, is guided into the engine special positive electrode power output conductor 32 built in the porous conductive socket 29, the positive electrode conductor 30 for other electric devices, and then flows through the wires into the engine special positive electrode tail 10B on the back side 2-1-2 of the top cap of the accumulator and the positive electrode terminal tail 9B for other electric devices on the back side of the top cap, and is introduced into the engine special positive electrode terminal head 10A on the front side 2-1-1 of the top cap of the accumulator and the positive electrode terminal head 9A for other electric devices on the front side of the top cap.

When the multi-plug intelligent controller 1 is setting up the anti-theft state: the accumulator 2 with two layers of sealing caps then comes into the low-current power-limiting state, two positive electrode terminal heads 9A, 10A on the top cap 2-1 of the accumulator still remains the power output, but the controlled amount of current is less than the high current required to start the engine, if the engine is forced to start in the state of anti-theft setting, the chip 21 of the multi-plug intelligent controller 1 detects an abnormally high current, immediately triggers the buzzer 4 to send out alarm sounds, the relay controlling the engine power 20 instantaneously disconnects the engine special positive electrode power, and the power output of the engine special positive electrode terminal head 10A on the front side of the top cap 2-1 of the accumulator is terminated, and the engine of the vehicle is made not to start, at the moment the vehicle the positive electrode terminal head 9A for other electric devices on the front side of the top cap still supply power normally and is not affected, the precise devices in the vehicle would not be affected by possibly improper using and involuntary touching the alarms by the car owner. But if the car is deliberately theft, the power of the positive electrode terminal head 9A for other electric devices on the front side of the top cap is intended to connected to the engine special positive electrode terminal head 10A on the front side of the top cap in the way of connecting with the wires, then when the engine is started again, the chip 21 of the multi-plug intelligent controller 1 detects an abnormally high current, immediately commands secondly the relay 19 controlling other electric devices to disconnect the power of the positive electrode, and the power output of the positive electrode terminal head 9A for other electric devices on the front side of the top cap 2-1 of the accumulator is terminated, the engine still cannot be started, and the buzzer 4 is triggered to send out alarm sounds again, at the moment the vehicle can be confirmed to be being theft, and not to be improper used or involuntary touched by the car owner. Although the entire vehicle has been powered off, the body of the multi-plug intelligent controller 1 integrated in one with the accumulator 2 with two layers of sealing caps still has power supply, and the anti-theft operation is being continued, the buzzer 4 continuously sends out alarm sounds, and makes the vehicle in the state that the vehicle can not be started, to assure that the vehicle can not be theft.

The present invention integrated an intelligent controller, a buzzer and a battery with two layers of sealing caps in one. All of the afore-mentioned circuits are hidden in an unexposed state. The structure of an battery with two positive electrode terminals can perform the original functions of charging and discharging, can perform the anti-theft function effectively and is not easy to be damaged, and can automatically detect the inner state of the battery, and constantly remind the car owner to maintain the battery and to increase the service life of the battery, in order to achieve the various functions of the battery.

The above description about the present invention is illustrative but not restrictive. Those skilled in the art can modify, change or do some equivalent operations within the spirit and scope limited by the claims without departure from the protection scope of the present invention.

What is claimed is:

1. An intelligent multifunctional accumulator, comprising:
   an accumulator with sealing caps comprised of a top sealing cap and an inner sealing cap, the top sealing cap having a front side and a back side facing the inner sealing cap and opposite to the front side;
   a multi-plug intelligent controller;
   a sensor;
   a signal transmitter; and
   a buzzer;
   characterized in that:
   the accumulator with sealing caps is so configured that two positive electrode terminals and one cathode terminal are disposed on the top sealing cap;
   one of the said two positive electrode terminals is an engine special positive electrode terminal head on the front side of the top sealing cap, the other is a positive electrode terminal head for other electric devices on the front side of the top sealing cap;
   a controller box-case for the multi-plug intelligent controller to put in, a porous conductive socket corresponding to plugs of the multi-plug intelligent controller in the controller box-case, a buzzer, a power introducing socket of positive electrodes and a cathode, and a sensor signal introducing socket are disposed on the back side on the top sealing cap;
   the top sealing cap and the inner sealing cap of the accumulator are fused;
   the positive electrode terminals and the cathode terminal on the inner sealing cap and a sensor signal terminal in an accumulator liquid-water tank tub are inserted into the power introducing socket and the sensor signal introducing socket on the back side of the top sealing cap, and are linked and introduced through wires into the porous conductive socket;
   the multi-plug intelligent controller with an electric lock is inserted into the controller box-case, a tongue of the lock is automatically inserted into a hole of the lock, and cannot be taken out, if there is not a password signal;
   the plugs of the multi-plug intelligent controller are connected to conductors in the porous conductive socket, power and signal are introduced through the plugs of the multi-plug intelligent controller into a circuit of the controller, and an engine special power, and of power for other electric devices are controlled by a chip and a relay; and
   the sensor signal is computed by the chip, and an inner state of a battery is displayed by an LCD or sent out by voice prompts.

2. The intelligent multifunctional accumulator as claimed in claim 1, characterized in that: the two positive electrode terminals, the one cathode terminal disposed on the top sealing cap separately control and supply power for the engine special power and for the power of other electric devices, by which an anti-theft is achieved, and electronic devices in a car are not affected.

3. The intelligent multifunctional accumulator as claimed in claim 1, characterized in that: the power wires and signal wires are all disposed on the back side of the top sealing cap, all of the control circuits are totally circulated in a cavity formed by fusing the top sealing cap and the inner sealing cap and in the controller box-case, and the circuits are in an unexposed state.

4. The intelligent multifunctional accumulator as claimed in claim 1, characterized in that: the buzzer is hidden in a cavity formed by fusing the top sealing cap and the inner sealing cap, the signal wires are directly introduced into the circuit of the controller in the box-case of the cavity of the battery, and the circuit is in an unexposed state.

5. The intelligent multifunctional accumulator as claimed in claim 1, characterized in that: the controller box-case is disposed on the back side of the top sealing cap, for the controller with a password remote control electric lock to insert into and to fasten, which cannot be taken out and damaged from the controller box-case.

6. The intelligent multifunctional accumulator as claimed in claim 1, characterized in that:
- two big relays are disposed in the multi-plug intelligent controller; and
- in the state of anti-theft setting, they are compared with the amount of the current defined by the chip to control respectively the power outputs for the engine power and for the power of other electric devices.

7. The intelligent multifunctional accumulator as claimed in claim 1, characterized in that: the sensor is disposed in the accumulator liquid-water tank tub, and the inner state of the battery is displayed by the LCD and sent out by voice prompts.

* * * * *